(12) United States Patent
Ryu et al.

(10) Patent No.: US 9,261,707 B2
(45) Date of Patent: Feb. 16, 2016

(54) STEREOSCOPIC IMAGE DISPLAY DEVICE

(71) Applicant: LG Display Co., Ltd., Seoul (KR)

(72) Inventors: Seung-Man Ryu, Paju-si (KR);
Jin-Yeong Kim, Paju-si (KR); Mee-Ran Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 531 days.

(21) Appl. No.: 13/711,089

(22) Filed: Dec. 11, 2012

(65) Prior Publication Data

US 2014/0071526 A1    Mar. 13, 2014

(51) Int. Cl.
*G02B 27/26* (2006.01)
*G02B 27/22* (2006.01)
*G02F 1/1335* (2006.01)

(52) U.S. Cl.
CPC ............ *G02B 27/26* (2013.01); *G02B 27/22* (2013.01); *G02F 1/133512* (2013.01)

(58) Field of Classification Search
CPC ............ G02B 27/26; G02B 27/2228; G02B 2207/123; G02B 27/22; G02F 1/133512; G02F 2001/133631; G02F 1/136209
USPC ............ 359/462–477; 349/96, 104, 110, 111
See application file for complete search history.

(56) References Cited

U.S. PATENT DOCUMENTS

| | | | |
|---|---|---|---|
| 7,626,644 B2 * | 12/2009 | Shestak | H04N 13/045 348/57 |
| 2007/0258140 A1 | 11/2007 | Shestak et al. | |
| 2010/0149472 A1 * | 6/2010 | Hoshi | G02B 5/3083 349/119 |
| 2011/0128269 A1 * | 6/2011 | Lee et al. | 345/211 |
| 2011/0298792 A1 | 12/2011 | Lim | |

(Continued)

FOREIGN PATENT DOCUMENTS

| | | |
|---|---|---|
| CN | 101438599 A | 5/2009 |
| CN | 101896842 A | 11/2010 |

(Continued)

OTHER PUBLICATIONS

Korean Intellectual Property Office, Office Action, Korean Patent Application No. 10-2012-0100934, Sep. 11, 2013, four pages.

(Continued)

*Primary Examiner* — Scott J Sugarman
*Assistant Examiner* — Daniele Manikeu
(74) *Attorney, Agent, or Firm* — Fenwick & West LLP

(57) ABSTRACT

A stereoscopic image display device includes a substrate; a plurality of black matrices formed parallel to one another on a first surface of the substrate; a plurality of black stripes formed on a second surface of the substrate opposite the first surface, each of the plurality of black stripes corresponding to one of the plurality of black matrices, each of the plurality of black stripes having a width equal to or greater than a width of the corresponding one of the plurality of black matrices; and a patterned retarder film formed on the plurality of black stripes, the patterned retarder film including a plurality of first retarder patterns and a plurality of second retarder patterns, wherein a first retarder pattern is disposed over a region between a first pair of black stripes, and a second retarder pattern is disposed over a region between a second pair of black stripes that is adjacent to the first pair of black stripes, and wherein the width of each of the plurality of black stripes is less than or equal to twice an adhesion margin of the patterned retarder film.

22 Claims, 8 Drawing Sheets

(56) References Cited

U.S. PATENT DOCUMENTS

| | | | |
|---|---|---|---|
| 2012/0013610 A1* | 1/2012 | Chae | G02B 27/22 345/419 |
| 2012/0140129 A1* | 6/2012 | Chang et al. | 349/15 |
| 2012/0162763 A1* | 6/2012 | Son et al. | 359/463 |

FOREIGN PATENT DOCUMENTS

| | | |
|---|---|---|
| CN | 102314019 A | 1/2012 |
| CN | 102466919 A | 5/2012 |
| CN | 102572473 A | 7/2012 |
| JP | 2002-185983 A | 6/2002 |
| JP | 2010-096900 A | 4/2010 |
| JP | 2011-158574 | 8/2011 |
| JP | 2011-221113 A | 11/2011 |
| KR | 10-2005-0034850 A | 4/2005 |
| WO | WO 2011/125986 A1 | 10/2011 |

OTHER PUBLICATIONS

Japanese Patent Office, Office Action, Japanese Patent Application No. 2012-275504, Jan. 21, 2014, six pages.
State Intellectual Property Office of the People's Republic of China, First Office Action, Chinese Patent Application No. 201210567877.X, Feb. 6, 2015, eighteen pages.
German Patent and Trademark Office, Office Action, German Patent Application No. 10 2012 024 524.6, Apr. 12, six pages.

* cited by examiner

ID EXAMPLES
STEREOSCOPIC IMAGE DISPLAY DEVICE

CROSS-REFERENCE TO RELATED APPLICATIONS

The present application claims the priority to Korean Patent Application No. 10-2012-0100934 filed in the Republic of Korea on Sep. 12, 2012, which is hereby incorporated by reference in its entirety.

BACKGROUND

1. Field of the Disclosure

The present disclosure relates to a stereoscopic image display device, and more particularly, to a stereoscopic image display device capable of improving crosstalk between stereoscopic images.

2. Discussion of the Related Art

A stereoscopic image display device may embody stereoscopic images using a stereoscopic technique or an autostereoscopic technique.

The stereoscopic technique employs binocular disparity images having a high stereoscopic effect and may be classified into a glasses type and a non-glasses type. Both the glasses-type stereoscopic technique and the non-glasses-type stereoscopic technique are being put to practical use. In the glasses-type stereoscopic technique, binocular disparity images may be displayed on a direct-view display device or a projector by changing the polarization direction of the binocular disparity images, or using a time division method, and stereoscopic images may be embodied using polarized glasses or liquid crystal (LC) shutter glasses. In the non-glasses-type stereoscopic technique, an optical plate (e.g., a parallax barrier) configured to separate an optical axis of a binocular disparity image may be installed in front of or behind a display screen.

FIG. 1 is a view of illustrating a related art stereoscopic image display device.

Referring to FIG. 1, a glasses-type stereoscopic image display device 1 may include a thin-film transistor (TFT) array substrate 10, a color filter substrate 12 including color filters 13 and black matrices 14, and a liquid crystal (LC) layer 15 interposed between the TFT array substrate 10 and the color filter substrate 12. Also, an upper polarizer 16a may be disposed on the color filter substrate 12, and a lower polarizer 16b may be disposed under the TFT array substrate 10. A patterned retarder 17 may be disposed on the upper polarizer 16a, and a surface-processed protection film 18 may be disposed on the patterned retarder 17.

The glasses-type stereoscopic image display device 1 having the above-described construction may alternately display left-eye images and right-eye images and switch characteristics of polarized light incident to polarized glasses through the patterned retarder 17. Thus, the glasses-type stereoscopic image display device 1 may spatially divide the left-eye images and the right-eye images from each other and embody stereoscopic images.

During formation of stereoscopic images, a vertical viewing angle of a stereoscopic image display device may be determined by the width of the black matrices 14 and the distance between the color filters 13 and the patterned retarder 17. Although the related art stereoscopic image display device embodies a vertical viewing angle of about 26° by increasing the width of the black matrices, an increase in the width of the black matrices may lead to degradation of an aperture ratio and luminance.

SUMMARY OF THE INVENTION

Accordingly, the present invention is directed to a stereoscopic image display device that substantially obviates one or more of the problems due to limitations and disadvantages of the related art.

An object of the present disclosure is to provide a stereoscopic image display device, which may optimize the widths of the black matrices and black stripes, and improve crosstalk between stereoscopic images without degrading an aperture ratio and luminance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a stereoscopic image display device includes a substrate; a plurality of black matrices formed parallel to one another on a first surface of the substrate; a plurality of black stripes formed on a second surface of the substrate opposite the first surface, each of the plurality of black stripes corresponding to one of the plurality of black matrices, each of the plurality of black stripes having a width equal to or greater than a width of the corresponding one of the plurality of black matrices; and a patterned retarder film formed on the plurality of black stripes, the patterned retarder film including a plurality of first retarder patterns and a plurality of second retarder patterns, wherein a first retarder pattern is disposed over a region between a first pair of black stripes, and a second retarder pattern is disposed over a region between a second pair of black stripes that is adjacent to the first pair of black stripes, and wherein the width of each of the plurality of black stripes is less than or equal to twice an adhesion margin of the patterned retarder film.

In another aspect, an image display device includes a substrate; a plurality of black matrices formed in a row on a first surface of the substrate; a plurality of black stripes formed on a second surface of the substrate opposite the first surface, each of the plurality of black stripes corresponding to one of the plurality of black matrices, each of the plurality of black stripes having a width equal to or greater than a width of the corresponding one of the plurality of black matrices; and a patterned retarder film formed on the plurality of black stripes, the patterned retarder film including a plurality of first retarder patterns and a plurality of second retarder patterns, wherein a first retarder pattern is disposed over a region between a first pair of black stripes, and a second retarder pattern is disposed over a region between a second pair of black stripes that is adjacent to the first pair of black stripes, and wherein the width of each of the plurality of black stripes is within a range given by a following equation:

$$\left(\frac{2}{1-CT}\right)\{(1+CT)m - (CT \times p)\} \le s \le 2 \times m$$

wherein s denotes the width of the each of the plurality of black stripes, CT denotes a crosstalk rate of stereoscopic images, m denotes a length of a misalignment of interfaces of the first retarder patterns and the second retarder patterns with respect to a center of the plurality of light blocking stripes or a center of the plurality of light blocking matrices, and p denotes a distance between a central portion of a first one of the plurality of black stripes and a central portion of a second one of the plurality of black stripes adjacent to the first one of the plurality of black stripes or a distance between a central portion of a first one of the plurality of black matrices and a central portion of a second one of the plurality of black matrices adjacent to the first one of the plurality of black matrices.

In another aspect, an image display device includes a substrate; a plurality of black matrices formed in a row on a first surface of the substrate; a plurality of black stripes formed on a second surface of the substrate opposite the first surface, each of the plurality of black stripes corresponding to one of the plurality of black matrices, each of the plurality of black stripes having a width equal to or less than a width of the corresponding one of the plurality of black matrices; and a patterned retarder film formed on the plurality of black stripes, the patterned retarder film including a plurality of first retarder patterns and a plurality of second retarder patterns, wherein a first retarder pattern is disposed over a region between a first pair of black stripes, and a second retarder pattern is disposed over a region between a second pair of black stripes that is adjacent to the first pair of black stripes, and wherein the width of each of the plurality of black matrices is less than or equal to twice an adhesion margin of the patterned retarder film.

In another aspect, an image display device includes a substrate; a plurality of black matrices formed in a row on a first surface of the substrate; a plurality of black stripes formed on a second surface of the substrate opposite the first surface, each of the plurality of black stripes corresponding to one of the plurality of black matrices, each of the plurality of black stripes having a width equal to or less than a width of the corresponding one of the plurality of black matrices; and a patterned retarder film formed on the plurality of black stripes, the patterned retarder film including a plurality of first retarder patterns and a plurality of second retarder patterns, wherein a first retarder pattern is disposed over a region between a first pair of black stripes, and a second retarder pattern is disposed over a region between a second pair of black stripes that is adjacent to the first pair of black stripes, and wherein the width of each of the plurality of black matrices is within a range given by a following equation:

$$\left(\frac{2}{1-CT}\right)\{(1+CT)m - (CT \times p)\} \le b \le 2 \times m$$

wherein b denotes the width of the plurality of black matrices, CT denotes a crosstalk rate of stereoscopic images, m denotes a length of a misalignment of interfaces of the first retarder patterns and the second retarder patterns with respect to a center of the plurality of light blocking stripes or a center of the plurality of light blocking matrices, and p a distance between a central portion of a first one of the plurality of black stripes and a central portion of a second one of the plurality of black stripes adjacent to the first one of the plurality of black stripes or a distance between a central portion of a first one of the plurality of black matrices and a central portion of a second one of the plurality of black matrices adjacent to the first one of the plurality of black matrices.

In another aspect a stereoscopic image display device comprises a substrate; a plurality of light blocking matrices formed on a first surface of the substrate; a plurality of light blocking stripes formed on a second surface of the substrate, wherein each of the plurality of light blocking stripes corresponds to a respective one of the plurality of light blocking matrices; and a patterned retarder film formed on the plurality of light blocking stripes; wherein a width of each of the plurality of light blocking stripes is greater than a width of each corresponding one of the plurality of light blocking matrices or the width of each of the plurality of light blocking stripes is less than the width of each corresponding one of the plurality of light blocking matrices to reduce cross talk in three-dimensional images generated by the stereoscopic image display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS

Reference will now be made in detail to the embodiments, examples of which are illustrated in the accompanying drawings.

Figure 1:
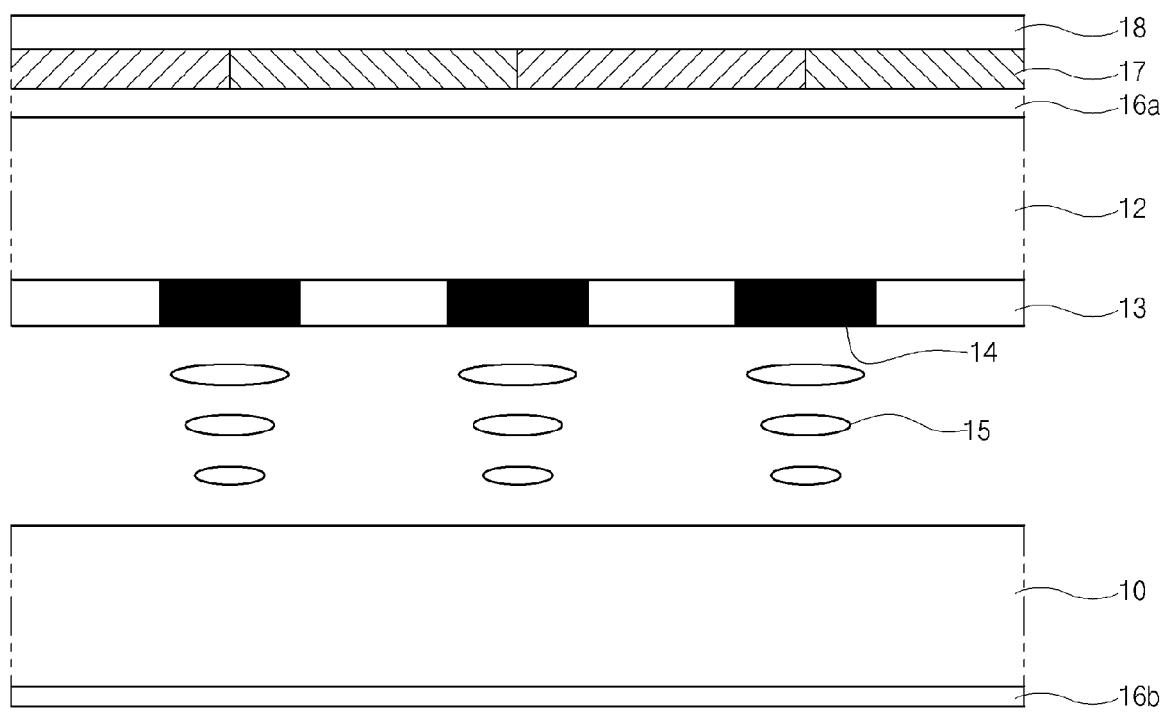
FIG. 1 is a view of a related art stereoscopic image display device.
Figure 2:
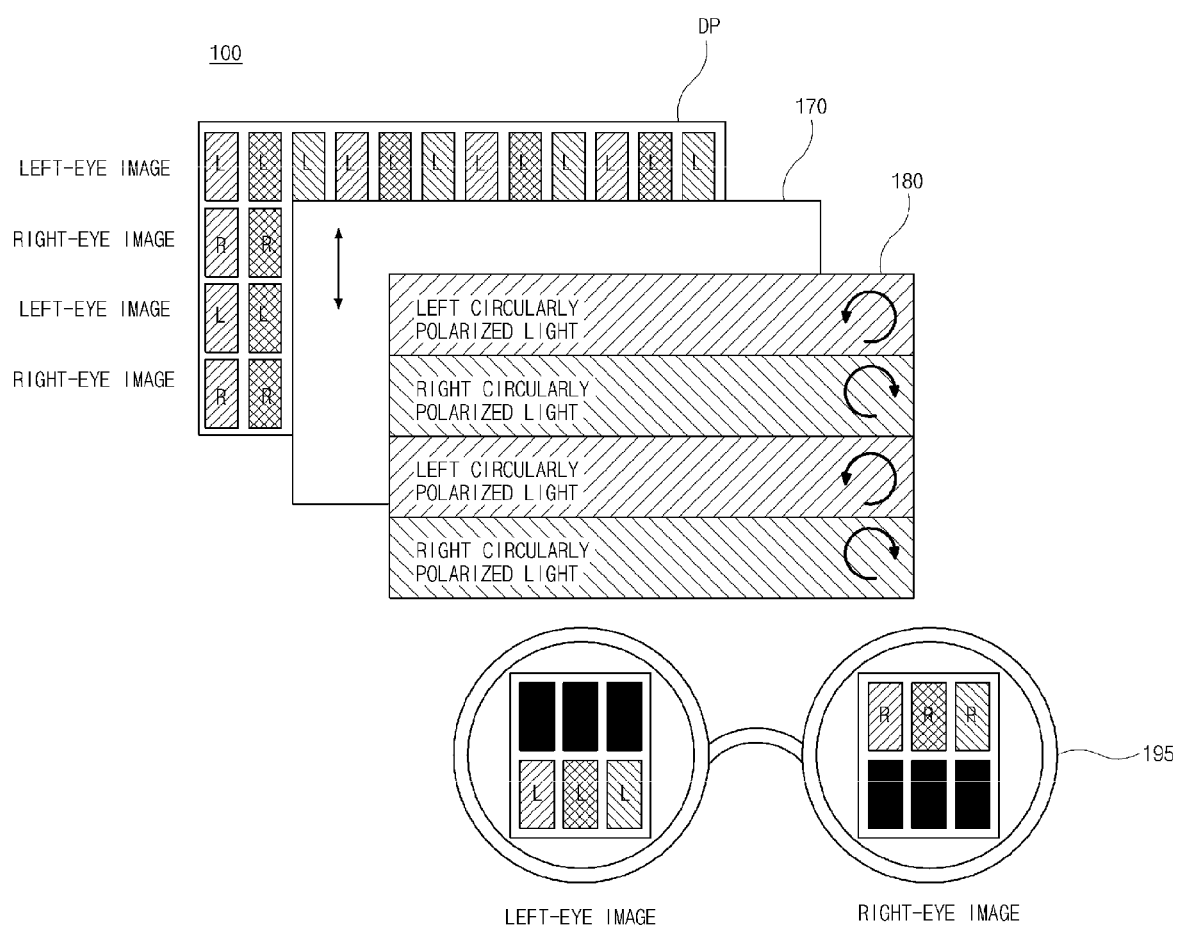
FIG. 2 is a view of a stereoscopic image display device according to an embodiment of the present invention.

FIG. 2 is a view of illustrating a stereoscopic image display device according to an embodiment of the present invention.

Referring to FIG. 2, the stereoscopic image display device 100 according to an embodiment of the present invention may include a display panel DP, a polarizer 170, a patterned retarder 180, and polarized glasses 195.

The display panel DP may be embodied not only by a liquid crystal (LC) display panel, but also by a display panel of one of other flat panel displays (FPDs), such as a field emission display (FED), a plasma display panel (PDP), and an electroluminescence device (EL).

When the display panel DP is embodied by a LC display panel, the stereoscopic image display device 100 may further include a backlight unit (not shown) disposed under the display panel DP and a polarizer (not shown) disposed between the display panel DP and the backlight unit. The patterned retarder 180 and the polarized glasses 195, which may serve as a stereoscopic image driving element, may spatially divide a left-eye image and a right-eye image from each other and embody binocular disparity.

The display panel DP may include two glass substrates and an LC layer interposed therebetween. A thin-film transistor (TFT) array may be formed on a TFT array substrate. A color filter array may be formed on a color filter substrate. The color filter array may include black matrices and color filters. A polarizer 170 may be adhered to the color filter substrate, and a polarizer (not shown) may also be adhered to the TFT array substrate.

Left-eye images L and right-eye images R may be alternately displayed on the display panel DP in a line-by-line manner. The polarizer 170, which may be an analyzer adhered onto the color filer substrate of the display panel DP, may transmit only specific linearly polarized light out of incident light transmitted through the LC layer of the display panel DP.

The patterned retarder 180 may include first retarder patterns and second retarder patterns alternately disposed in a line-by-line manner. The first and second retarder patterns may be disposed in a line-by-line manner to form an angle of +45° and an angle of −45° with an absorption axis of the polarizer 170.

Each of the retarder patterns may retard the phase of light by wavelength (λ)/4 using a birefringence medium. An optical axis of the first retarder patterns may be orthogonal to an optical axis of the second retarder patterns.

Accordingly, the first retarder patterns may be disposed to correspond to lines of the display panel DP where a left-eye image is displayed, and convert light of the left-eye image into first polarized light (circularly or linearly polarized light). The second retarder patterns may be disposed to correspond to lines of the display panel where a right-eye image is displayed, and convert light of the right-eye image into second polarized light (circularly or linearly polarized light). In an example, the first retarder patterns may be embodied by a polarization filter configured to transmit left circularly polarized light, while the second retarder patterns may be embodied by a polarization filter configured to transmit right circularly polarized light.

A polarized light film configured to transmit only a first polarization element may be adhered to a left-eye side of the polarized glasses 195, while a polarized light film configured to transmit only a second polarization element may be adhered to a right-eye side of the polarized glasses 195. Accordingly, an observer wearing the polarized glasses 195 may see only left-eye images with the left eye, and see only right-eye images with the right eye, so the observer may sense images displayed on the display panel DP as stereoscopic (i.e., three-dimensional) images.

Hereinafter, a stereoscopic image display device and a method of manufacturing the same according to embodiments of the present invention will be described in further detail. The same reference numerals are used to denote the same elements as in the foregoing stereoscopic image display device, and thus a description thereof is provided for brevity.

Figure 3:
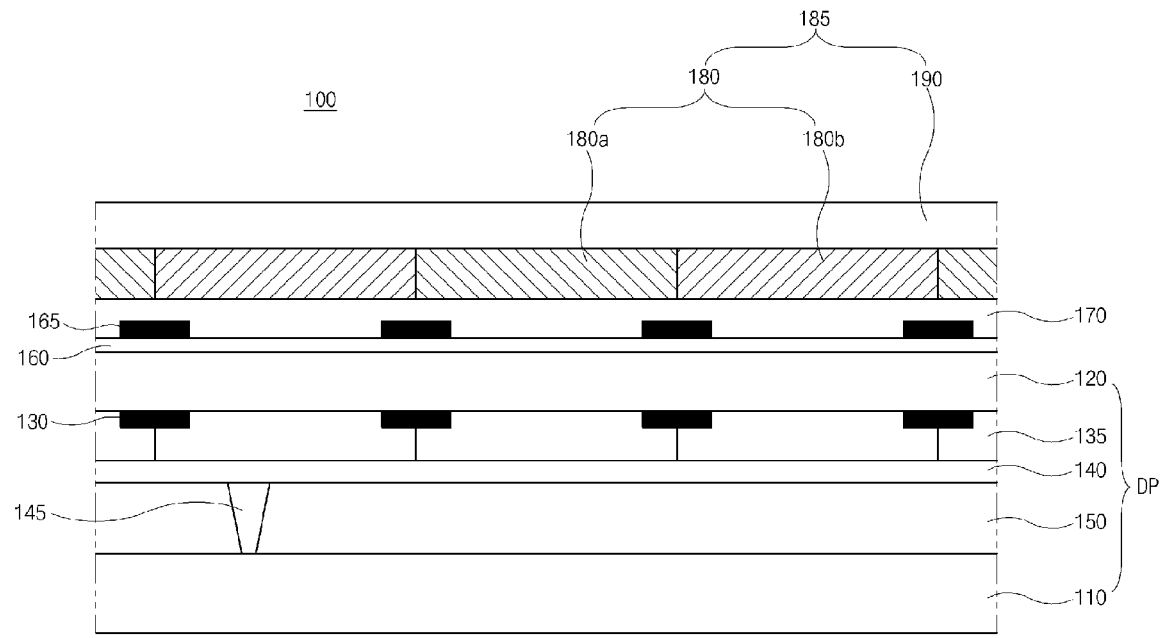
FIGS. 3 through 5 are views of stereoscopic image display devices according to other embodiments of the present invention.
Figure 4:
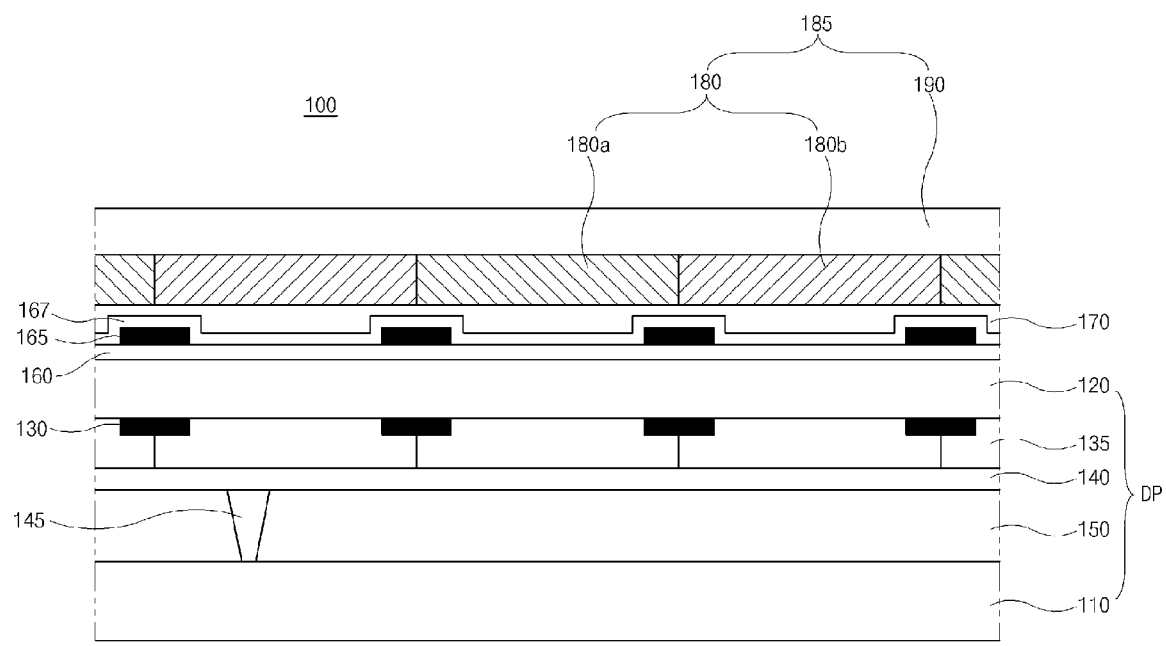
Figure 5:
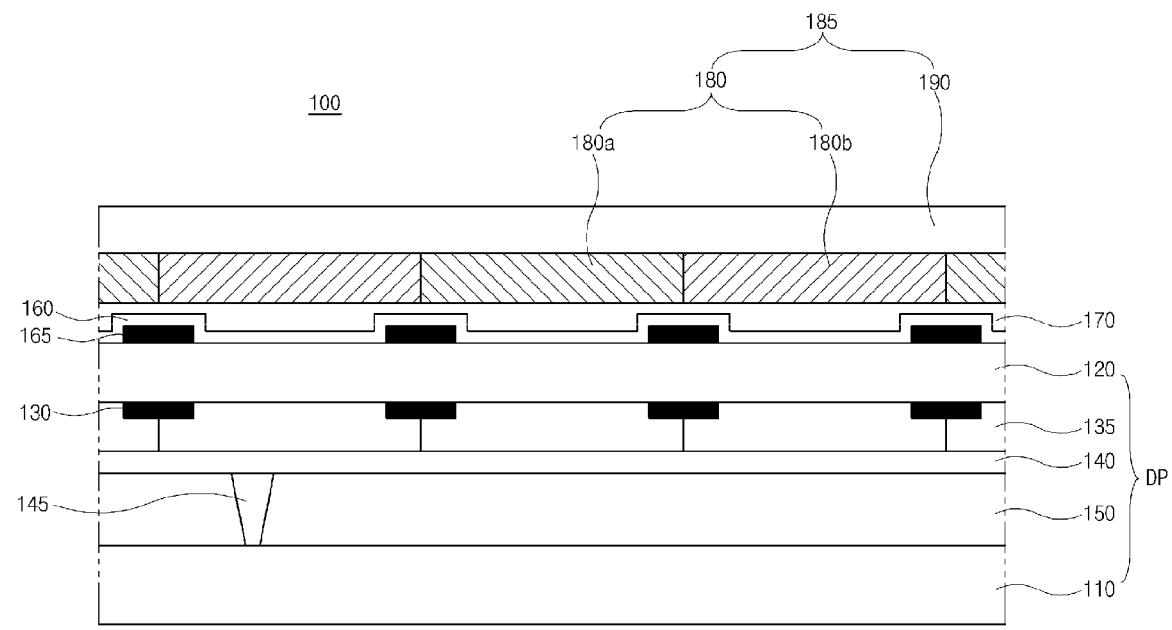
Figure 6:
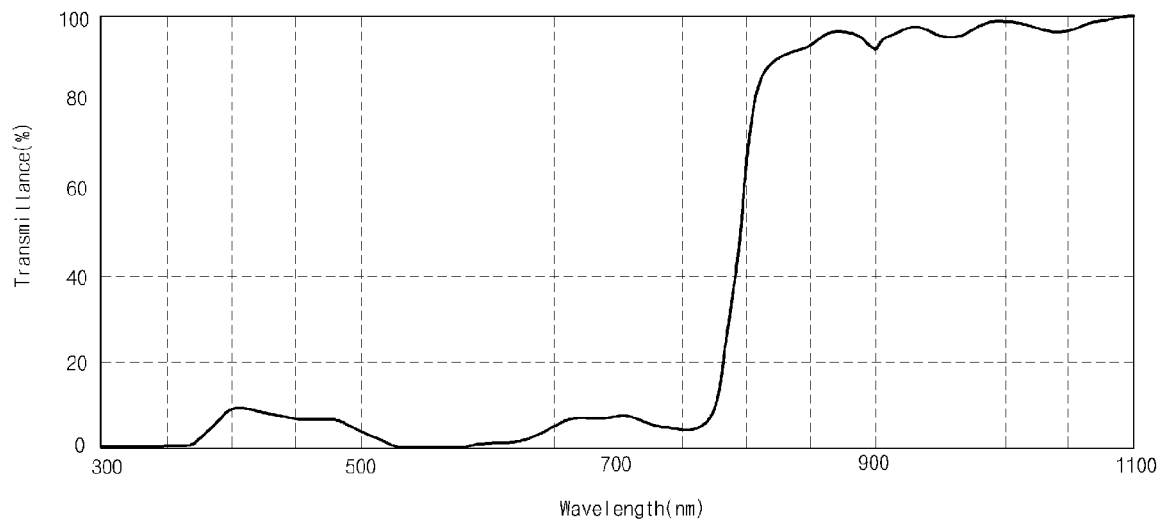
FIG. 6 is a graph of transmittance relative to a wavelength range of a photosensitive resin composition according to the present invention.

FIGS. 3 through 5 are views of illustrating stereoscopic image display devices according to other embodiments of the present invention, and FIG. 6 is a graph of transmittance relative to a wavelength range of a photosensitive resin composition according to the present invention.

Referring to FIG. 3, a stereoscopic image display device 100 according to a first embodiment of the present invention may include a display panel DP including a TFT array substrate 110, a color filter substrate 120 disposed opposite the TFT array substrate 110, and the display panel DP further including a LC layer 150 interposed between the TFT array substrate 110 and the color filter substrate 120.

More specifically, a TFT array may be formed on the TFT array substrate 110. The TFT array may include a plurality of data lines to which red (R), green (G), and blue (B) data voltages are applied, a plurality of gate lines (or scan lines) configured to intersect the data lines and to which a gate pulse (or scan pulse) is applied, a plurality of TFTs formed at intersections between the data lines and the gate lines, a plurality of pixel electrodes configured to charge a LC cell with a data voltage, and a storage capacitor connected to each of the pixel electrodes to maintain the voltage of the LC cell.

A common electrode disposed opposite the pixel electrodes to form an electric field may be formed on the color filter substrate 120 in a vertical or lateral field driving method, such as a twisted nematic (TN) mode and a vertical alignment (VA) mode. Also, the common electrode may be formed on the TFT array substrate 110 along with the pixel electrode in a lateral field driving method, such as an in-plane switching (IPS) mode and a fringe field switching (FFS) mode.

R, G, and B color filters 135 may be formed on an inner surface of the color filter substrate 120, and a plurality of light blocking matrices 130 may be formed between the R, G, and B color filters 135. In one embodiment, the light blocking matrices are representative of black matrices and are hereinafter referred to as black matrices 130. Note that in alternative embodiments, other dark colors may be used for the light blocking matrices other than black. An overcoat layer 140 may be formed to protect the color filters 135 and the black matrices 130. The color filters 135 may convert light, which is emitted by a backlight unit and transmitted through the LC layer 150, into red, green, and blue light. Also, the black matrices 130 may be respectively disposed in the color filters 135 and divide a left-eye image and a right-eye image from each other. The overcoat layer 140 may reduce a step difference between the color filters 135 and protect the color filters 135. Here, although it is assumed in the drawings that the color filters 135 are formed after forming the black matrices 130, the black matrices 130 may be formed after forming the color filters 135.

An alignment layer (not shown) configured to set pretilt angles of liquid crystals between the TFT array substrate 110 and the color filter substrate 120, which may contact the LC layer 150, may be formed on each of the TFT array substrate 110 and the color filter substrate 120, and column spacers 145 may be formed to maintain a cell gap of the LC cell.

A rear-surface indium tin oxide (ITO) 160 may be formed on an outer surface of the color filter substrate 120, first light blocking stripes 165 may be formed on the rear-surface ITO 160, a polarizer 170 may be formed on the first light blocking stripes 165, and a patterned retarder film 185 may be formed on the polarizer 170. In one embodiment, the light blocking stripes are representative of black stripes and are hereinafter referred to as black stripes 165. Note that in alternative embodiments, other dark colors may be used for the light blocking stripes other than black.

The rear-surface ITO 160 may be formed on the entire surface of the color filter substrate 120 and externally discharge static electricity generated on the color filter substrate 120. The first black stripes 165 corresponding to the black matrices 130 may be formed on the rear-surface ITO 160. The above-described polarizer 170 may be formed on the first black stripes 165 and polarize light transmitted through the display panel DP. In addition, as shown in FIG. 4, an adhesive 167 may be formed on the polarizer 170 and adhered onto the first black stripes 165 and the rear-surface ITO 160.

The patterned retarder film 185 may be disposed on the polarizer 170. As described above, the patterned retarder film 185 may include a first retarder pattern 180*a* and a second retarder pattern 180*b* formed on a protection film 190. The first retarder pattern 180*a* may be disposed to correspond to a line of the display panel DP where a left-eye image is displayed, and convert light of the left-eye image into first polarized light (circularly or linearly polarized light). The second retarder pattern 180b may be disposed to correspond to a line of the display panel DP where a right-eye image is displayed, and convert light of a right-eye image into second polarized light (circularly or linearly polarized light). In an example, the first retarder pattern 180a may be embodied by a polarization filter configured to transmit left circularly polarized light, and the second retarder pattern 180b may be embodied by a polarization filter configured to transmit right circularly polarized light.

The first black stripes 165 may be formed in regions corresponding to the black matrices 130. Here, the width of the first black stripes 165 may be controlled to prevent a reduction in the aperture ratio of the display device, and minimize the crosstalk of stereoscopic images.

Meanwhile, referring to FIG. 5, unlike the above-described stereoscopic image display device 100, first black stripes 165 may be formed on an outer surface of a color filter substrate 120, and a rear-surface ITO 160 may be formed to cover the first black stripes 165. Also, a polarizer 170 may be formed on the rear-surface ITO 160, and a patterned retarder film 185 may be disposed on the polarizer 170. As described above, the patterned retarder film 185 may include a first retarder pattern 180a and a second retarder pattern 180b formed on a protection film 190.

The black matrices 130 and the first black stripes 165 according to the present invention may be formed of a photosensitive resin composition containing carbon black. More specifically, the photosensitive resin composition used as a material of the black matrices 130 and the first black stripes 165 may contain a pigment, a binder, a multifunctional monomer, a photo-initiator, a dispersing agent, and an additive.

The pigment may include at least one of a black pigment and an organic pigment. Carbon black may be used as the black pigment. However, the black pigment is not specifically limited to black pigment and may be any pigment having light-shielding characteristics. Examples of the black pigment may be channel black, furnace black, thermal black, or lamp black. Also, the organic pigment may be a water-soluble azo pigment, an insoluble azo pigment, a phthalozyanin pigment, a quinacridone pigment, an isoindolinone pigment, an isoindoline pigment, a perylene pigment, a perynone pigment, a dioxazine pigment, an anthraquinone pigment, a dianthraquinonyl pigment, an anthrapyrimidine pigment, an anthanthrone pigment, an indanthrone pigment, a flavanthrone pigment, a pyranthrone pigment, or a diketopyrrolopyrrole (DPP) pigment.

The binder may improve binding characteristics of the resin composition, and a material capable of being copolymerized with another monomer may be used as the binder. The binder may be, for example, at least one selected from the group consisting of an acrylic resin, a polyimide resin, a phenolic resin, and a cardo resin. Also, the resin may be a compound containing acid radicals or epoxy radicals. Preferably, an epoxy acrylate resin may be used as the binder.

The multifunctional monomer may be a compound that may be polymerized using a photo-initiator. The multifunctional monomer may be an acrylate-based monomer, for example, ethyleneglycol diacrylate, 1,4-cyclohexanediol diacrylate, trimethylol triacrylate, trimethylolpropane triacrylate, pentaerythritol triacrylate, tetraethyleneglycol diacrylate, dipentaerythritol triacrylate, dipentaerythritol tetraacrylate, sorbitol triacrylate, sorbitol tetraacrylate, vinyl acetate, or triallyl cyanurate. In addition to the above-described monomers, a polymer, such as a dimer or a trimer, may be effectively used.

The photo-initiator may be a material configured to generate radicals due to light, and initiate polymerization. The photo-initiator may be at least one selected from the group consisting of an acetophenone-based compound, a biimidazone-based compound, a triazine-based compound, and an oxime-based compound. Preferably, the oxime-based compound may be used as the photo-initiator.

The dispersing agent may be used to prevent elution of pigment elements from the resin composition. A surfactant may be used as the dispersing agent. The dispersing agent may be, for example, a silicon-based surfactant, a fluorine (F)-based surfactant, an ester-based surfactant, an anionic surfactant, a cationic surfactant, a nonionic surfactant, or an amphoteric surfactant.

The additive may be added to the resin composition according to the present invention as needed. The additive may be a filler, a curing agent, an antioxidant, or an ultraviolet (UV) absorber.

As described above, the photosensitive resin composition used as a material of the black matrices 130 and the first black stripes 165 may include the pigment, the binder, the multifunctional monomer, the photo-initiator, the dispersing agent, and the additive. Referring to FIG. 6, since the photosensitive resin composition according to the present invention contains the pigment element, the photosensitive resin composition may slightly transmit visible light, but the photosensitive resin composition may exhibit a transmittance of about 60% or higher in the wavelength range of about 800 nm or more. Accordingly, in the present invention, the black matrices 130 and the first black stripes 165 may be manufactured using the above-described photosensitive resin composition.

Furthermore, to form the black stripes 165 in precise positions, the black matrices 130 formed on the color filter substrate 120 may be used as an alignment key, or an additional mask alignment key (MAK) may be used. Also, since the black stripes 165 may be formed using a photo mask process or a printing process, errors may be minimized.

However, as described in Korean Patent Application No. 10-2010-0035184, misalignment may occur due to an adhesion margin. Thus, crosstalk between stereoscopic images may occur, thereby degrading the resolution of the stereoscopic images.

Figure 7:
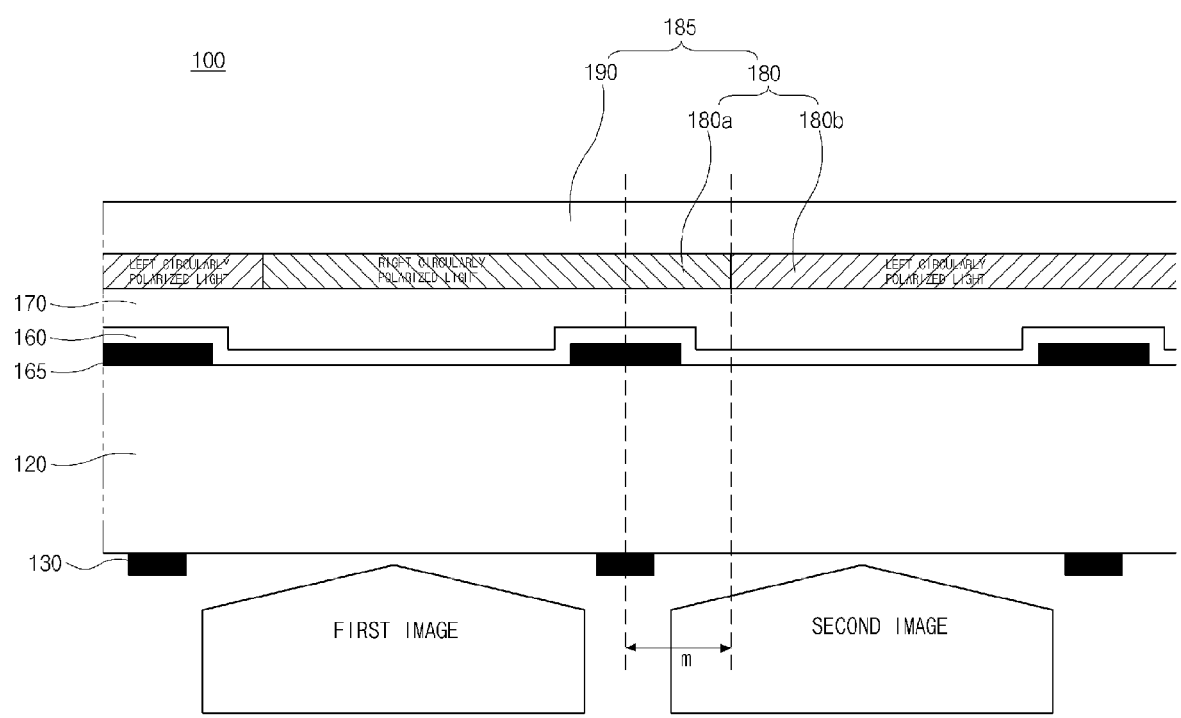
FIGS. 7 and 8 are views of crosstalk according to other embodiments of the present invention.
Figure 8:
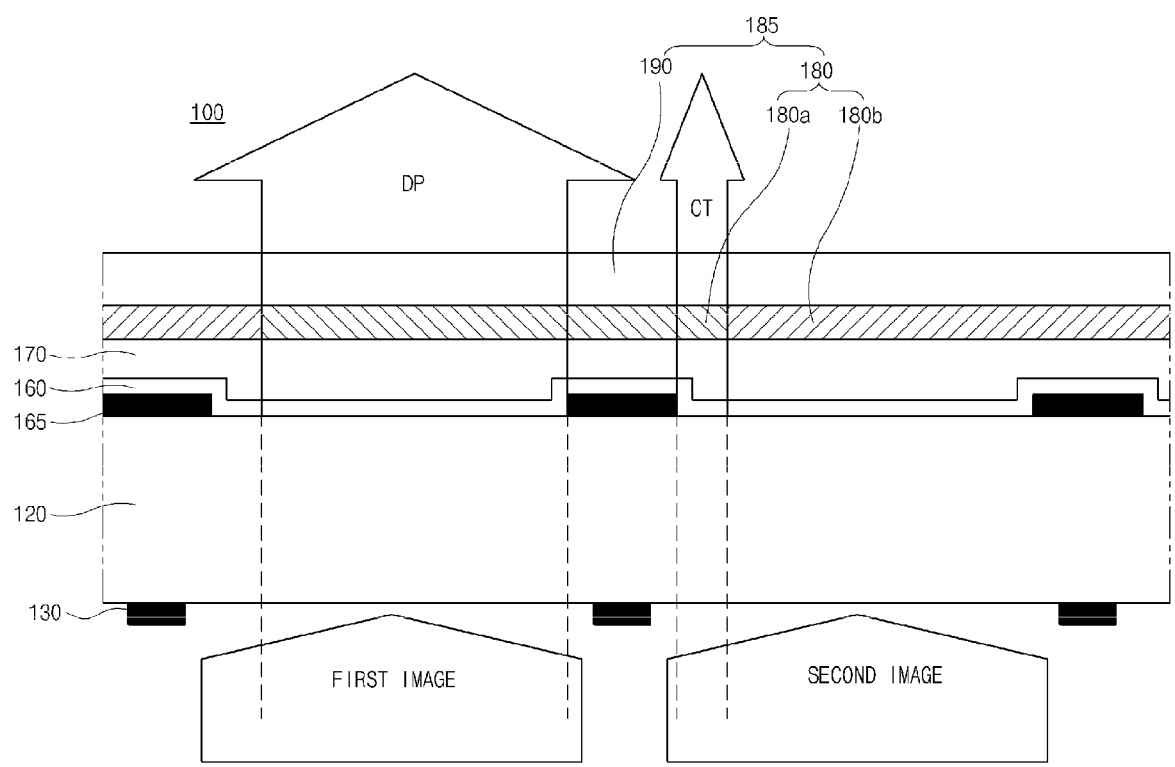

Hereinafter, crosstalk between stereoscopic images caused by the occurrence of misalignment due to the adhesion margin will be described in further detail. FIGS. 7 and 8 show a case where a patterned retarder film 185 is not precisely aligned with black stripes 165, and a margin corresponding to a length of "m" occurs. Comparing FIG. 7 with FIGS. 3 to 5, the center of the black stripes 165 in FIGS. 3 to 5 are aligned with either an edge of the first retarder pattern 180a or an edge of the second retarder pattern 180b. In contrast, in FIG. 7 the right edge of the first retarder pattern 180a is misaligned with the center of the black stripe 165 and the center of the black matrix 130 by a length of "m". Light emitted by a backlight unit and transmitted through a LC layer (not shown) may be transmitted through color filters (not shown) formed on a color filter substrate 120, and transmitted through the patterned retarder film 185. Referring to FIG. 8, to embody stereoscopic images as described above, light of a first image transmitted through a color filter (not shown) should pass through a first retarder pattern 180a formed on the patterned retarder film 185, while light of a second image transmitted through an adjacent color filter (not shown) should pass through a second retarder pattern 180b formed on the patterned retarder film 185. However, when misalignment due to the adhesion margin of the patterned retarder film 185 occurs by as much as the length of "m" as shown in FIGS. 7 and 8, light corresponding to a second image may be partially transmitted through the first retarder pattern 180a, or light corresponding to the first image may be partially transmitted through the second retarder pattern 180b, thereby causing crosstalk CT between stereoscopic images. The light corresponding to the first image is transmitted through the first retarder pattern 180a to the display panel DP.

To minimize crosstalk between the stereoscopic images, the width of the black matrices 130 formed on the color filter substrates 120, or the width of the black stripes 165 may be increased. However, when the widths of the black matrices 130 or the black stripes 165 are increased more than required, an aperture ratio and luminance may be degraded as described above.

Hereinafter, an embodiment of the present invention for designing optimum black stripes 165 will be described with reference to FIG. 9. In the following embodiments, the same reference numerals are used to denote the same elements as in the stereoscopic image display device according to the above-described embodiment, and thus a description thereof will be provided for brevity.

A stereoscopic image display device 100 according to the present invention may include R, G, and B color filters (not shown) formed on one surface of a color filter substrate 120, and first black matrix 130a, second black matrix 130b, and third black matrix 130c are formed among the R, G, and B color filters with a width of b. Also, first black stripe 165a, second black stripe 165b, and third black stripe 165c have a width "s" equal to or greater than the width "b" (s>=b) of the first, second, and third black matrices 130a, 130b, and 130c, and may be formed on the other surface of the color filter substrates 120 to respectively correspond to the first, second, and third black matrices 130a, 130b, and 130c. Furthermore, as described above, a rear-surface ITO 160, a polarizer 170, and a patterned retarder film 185 may be stacked on the first, second, and third black stripes 165a, 165b, and 165c.

As stated above, the patterned retarder film 185 may include a first retarder pattern 180a and a second retarder pattern 180b. The first retarder pattern 180a may be disposed between the first and second black stripes 165a and 165b, while the second retarder pattern 180b may be disposed between the second and third black stripes 165b and 165c.

The widths of the first, second, and third black stripes 165a, 165b, and 165c of the stereoscopic image display device according to the present invention may be determined by crosstalk CT, an adhesion margin "m" of the patterned retarder film 185, and a pixel size p, and a detailed description thereof will be described below.

An equation for calculating the crosstalk CT of the stereoscopic image display device is as follows:

$$CT = \frac{m - (s/2)}{p - m - (s/2)}. \tag{1}$$

Specifically, crosstalk CT is a ratio of part of light corresponding to the first image, which does not pass the first retarder pattern 180a but passes the second retarder pattern 180b, to the light incident to the first image. That is, as crosstalk CT decreases, the quality of a stereoscopic image increases, while as crosstalk CT increases, the quality of the stereoscopic image decreases. In general, crosstalk CT may vary numerical values and ratios that may be allowed by each of stereoscopic image display devices according to the size of a display screen and a viewing distance.

Figure 9:
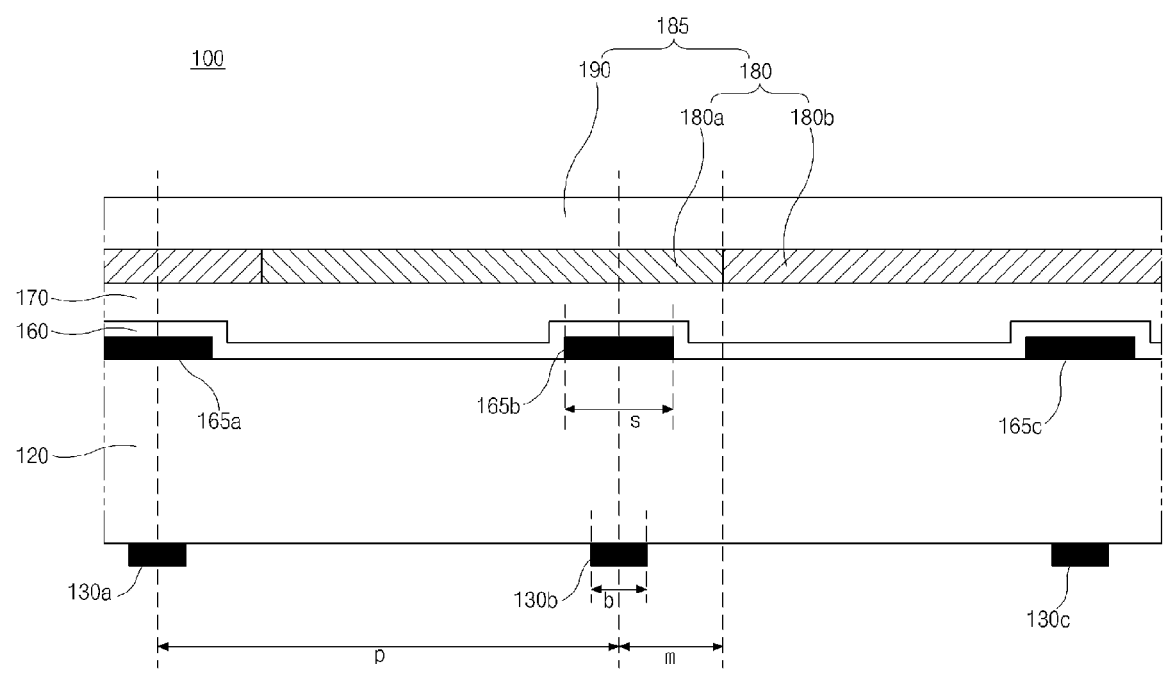
FIGS. 9 and 10 are views of stereoscopic image display devices according to other embodiments of the present invention.

In Equation (1), "m" denotes the adhesion margin of the patterned retarder film 185 shown in FIG. 9. As described above, the adhesion margin refers to a margin caused by misalignment of the patterned retarder film 185 from the black stripes 165. That is, the adhesion margin "m" may refer to the distance between a position of the color filter substrate 120 corresponding to an interface between the first and second retarder patterns 180a and 180b and a position of the color filter substrate 120 corresponding to a central portion of the second black stripe 165b.

Furthermore, in Equation (1), "p" may be defined as a pitch between adjacent ones of the first, second, and third black matrices 130a, 130b, and 130c, or a pitch between adjacent ones of the first, second, and third black stripes 165a, 165b, and 165c. The pitch "p" may be synonymous with the size of a pixel or the size of one color filter 135. That is, the pitch "p" may refer to the distance between a central portion of the first black matrix 130a and a central portion of the second black matrix 130b, or the distance between the central portion of the second black matrix 130b and a central portion of the third black matrix 130c, etc. Also, the pitch "p" may refer to the distance between a central portion of the first black stripe 165a and the central portion of the second black stripe 165b, or the distance between the central portion of the second black stripe 165b and a central portion of the third black stripe 165c, etc.

Finally, in Equation (1), "s" may be defined as the width of the first, second, and third black stripes 165a, 165b, and 165c. By moving the width "s" of the first, second, and third black stripes 165a, 165b, and 165c to the left side of Equation (1), Equation (1) may be transformed into Equation (2):

$$s = \left(\frac{2}{1 - CT}\right)\{(1 + CT)m - (CT \times p)\}. \tag{2}$$

Here, when the width "s" of the first, second, and third black stripes 165a, 165b, and 165c of an actually manufactured stereoscopic image display device is less than a value obtained from Equation (2), crosstalk CT further increases. Accordingly, the value of Equation (2) may become a minimum width Min(s) of the first, second, and third black stripes 165a, 165b, and 165c, and finally arranged as in Equation (3):

$$\text{Min}(s) = \left(\frac{2}{1 - CT}\right)\{(1 + CT)m - (CT \times p)\}. \tag{3}$$

Hereinafter, an example of a process of determining the minimum width Min(s) of the first, second, and third stripes 165a, 165b, and 165c according to the embodiment of the present invention will be described. Typically, a 42-inch stereoscopic image television may be manufactured to have a pixel size of about 500 μm and a CT rate of 2% or less, although the pixel size and the CT rate depend on the resolution of products. Here, when the patterned retarder film 185 has an adhesion margin "m" of about 50 μm, the minimum width Min(s) of the first, second, and third black stripes 165a, 165b, and 165c is as follows:

$$\text{Min}(s) = \left(\frac{2}{1 - 0.02}\right)\{(1 + 0.02)50 - (0.02 \times 500)\}$$

From the above Equation, a width of about 83.7 μm is obtained as the minimum width Min(s) of the first, second, and third black stripes 165a, 165b, and 165b. That is, the width "s" of the first, second, and third black stripes 165a, 165b, and 165c should be equal to or greater than at least about 83.7 μm so that a CT rate of about 2% or less can occur. When the first, second, and third black stripes 165a, 165b, and 165c are formed to a width "s" less than the minimum width Min(s), a CT rate may increase, so that the quality of stereoscopic images may seriously deteriorate.

In contrast, when the width "s" of the first, second, and third black stripes 165a, 165b, and 165c is increased more than required, an aperture ratio may be degraded and the luminance of stereoscopic images may be reduced, thereby dropping the resolution of images.

Hereinafter, the design of the maximum width Max(s) of the first, second, and third black stripes 165a, 165b, and 165c will be described. The maximum width Max(s) of the first, second, and third black stripes 165a, 165b, and 165c is defined as in Equation (4):

$$\text{Max}(s) = 2 \times m \qquad (4).$$

That is, the maximum width Max(s) of the first, second, and third black stripes 165a, 165b, and 165c doubles the length of the adhesion margin m. Specifically, since Equation (4) is obtained by substituting 0 (i.e., zero) into the crosstalk CT of Equation (2), it can be seen that the maximum width Max(s) of the first, second, and third black stripes 165a, 165b, and 165c is the width "s" of the first, second, and third black stripes 165a, 165b, and 165c that can prevent crosstalk. When the width "s" of the first, second, and third black stripes 165a, 165b, and 165c is more than twice the adhesion margin m, crosstalk may not occur, but an aperture ratio may be reduced. Therefore, the width "s" of the first, second, and third black stripes 165a, 165b, and 165c should be designed to be equal to or less than the maximum width Max(s) of the first, second, and third black stripes 165a, 165b, and 165c.

In the above-described example, the maximum width Max(s) of the first, second, and third black stripes 165a, 165b, and 165c becomes about 100 μm (=2×50 μm).

As described in the above-described embodiments, the width "s" of the first, second, and third black stripes 165a, 165b, and 165c may be finally arranged as in Equation (5):

$$\left(\frac{2}{1-CT}\right)\{(1+CT)m - (CT \times p)\} \le s \le 2 \times m. \qquad (5)$$

Figure 10:
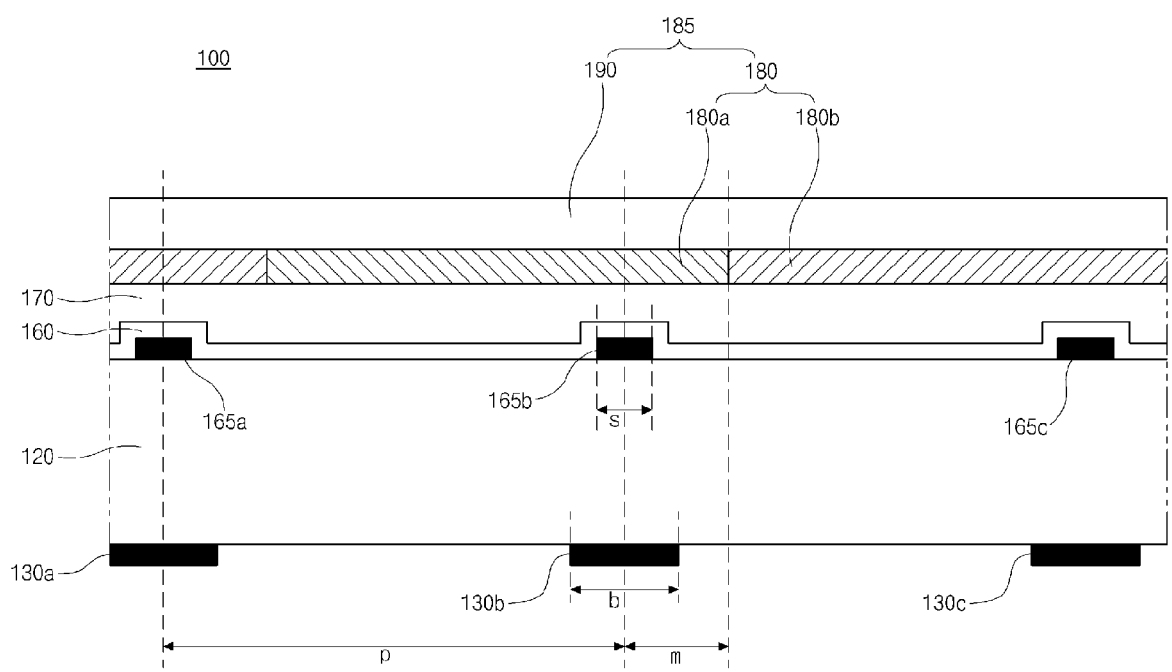

Hereinafter, another embodiment of the present invention for designing optimum black matrices 130 will be described with reference to FIG. 10. In the following embodiments, the same reference numerals are used to denote the same elements as in the stereoscopic image display device according to the above-described embodiment, and a description thereof is provided for brevity.

A stereoscopic image display device according to the present invention may include R, G, and B color filters (not shown) formed on one surface of the color filter substrate 120, and first black matrix 130a, second black matrix 130b, and third black matrix 130c formed between the R, G, and B color filters to a width of b. Also, first black stripe 165a, second black stripe 165b, and third black stripe 165c having a width "s" equal to or less than the width "b" (s=<b) of the first, second, and third black matrices 130a, 130b, and 130c may be formed to correspond to the first, second, and third black matrices 130a, 130b, and 130c. Furthermore, as described above, a rear-surface ITO 160, a polarizer 170, and a patterned retarder film 185 may be stacked on the first, second, and third black stripes 165a, 165b, and 165c.

As stated above, the patterned retarder film 185 may include a first retarder pattern 180a and a second retarder pattern 180b. The first retarder pattern 180a may be disposed between the first and second black stripes 165a and 165b, and a second retarder pattern 180b may be disposed between the second and third black stripes 165b and 165c.

In the stereoscopic image display device according to the present invention, the width of the first, second, and third black matrices 130a, 130b, and 130c may be determined by crosstalk CT, an adhesion margin "m" of the patterned retarder film 185, and a pixel size P, and a detailed description thereof will be described below.

An equation for calculating crosstalk CT of the stereoscopic image display device is as follows:

$$CT = \frac{m - (b/2)}{p - m - (b/2)}, \qquad (6)$$

Crosstalk CT, an adhesion margin m, and a pitch between adjacent ones of the first, second, and third black matrices 130a, 130b, and 130c, or adjacent ones of the first, second, and third black matrices 165a, 165b, and 165c are the same as described in the previous embodiment, and thus a description thereof will be omitted. In Equation (6), "b" is defined as the width of the first, second, and third black matrices 130a, 130b, and 130c. By applying the width "b" of the black matrices 130a, 130b, and 130c to the left side of Equation (6), Equation (6) may be transformed into Equation (7):

$$b = \left(\frac{2}{1-CT}\right)\{(1+CT)m - (CT \times p)\}. \qquad (7)$$

Here, when the width "b" of the first, second, and third black matrices 130a, 130b, and 130c of an actually manufactured stereoscopic image display device is less than a value obtained from Equation (7), crosstalk CT further increases. Accordingly, the value of Equation (7) may become a minimum width Min(b) of the first, second, and third black matrices 130a, 130b, and 130c and be finally arranged as in Equation (8):

$$\text{Min}(b) = \left(\frac{2}{1-CT}\right)\{(1+CT)m - (CT \times p)\}. \qquad (8)$$

Hereinafter, an example of a process of determining the minimum width Min(b) of the first, second, and third matrices 130a, 130b, and 130c according to the embodiment of the present invention will be described. Typically, a 47-inch stereoscopic image television may be manufactured to have a pixel size of about 550 μm and a CT rate of 2% or less, although the pixel size and the CT rate depend on the resolution of products. Here, when the patterned retarder film 185 has an adhesion margin "m" of about 40 μm, the minimum width Min(b) of the first, second, and third black matrices 130a, 130b, and 130c is as follows:

$$\text{Min}(b) = \left(\frac{2}{1-0.02}\right)\{(1+0.02)40 - (0.02 \times 550)\}.$$

From the above Equation, a width of about 60.8 μm is obtained as the minimum width Min(b) of the first, second, and third black matrices 130a, 130b, and 130c. That is, the width "b" of the first, second, and third black matrices 130a, 130b, and 130c should be equal to or more than at least about 60.8 µm so that a CT rate of about 2% or less can occur. When the first, second, and third black matrices 130a, 130b, and 130c are formed to a width "b" less than the minimum width Min(b), a CT rate may increase, so that the quality of stereoscopic images can seriously deteriorate.

In contrast, when the width "b" of the first, second, and third black matrices 130a, 130b, and 130c is increased more than required, an aperture ratio may be degraded and the luminance of stereoscopic images may be reduced, thereby dropping the resolution of images.

Hereinafter, the design of the maximum width Max(b) of the first, second, and third black matrices 130a, 130b, and 130c will be described. The maximum width Max(b) of the first, second, and third black matrices 130a, 130b, and 130c is defined as in Equation (9):

$$\text{Max}(b) = 2 \times m \qquad (9).$$

That is, the maximum width Max(b) of the first, second, and third black matrices 130a, 130b, and 130c doubles the adhesion margin m. Specifically, since Equation (9) is obtained by substituting 0 (i.e., zero) into the crosstalk CT of Equation (7), it can be seen that the maximum width Max(b) of the first, second, and third black matrices 130a, 130b, and 130c is the width "b" of the first, second, and third black matrices 130a, 130b, and 130c that can prevent crosstalk. When the width "b" of the first, second, and third black matrices 130a, 130b, and 130c is more than twice the adhesion margin m, crosstalk may not occur, but an aperture ratio may be reduced. Therefore, the width "b" of the first, second, and third black matrices 130a, 130b, and 130c should be designed to be equal to or less than the maximum width Max(b) of the first, second, and third black matrices 130a, 130b, and 130c.

In the above-described example, the maximum width Max(b) of the first, second, and third black matrices 130a, 130b, and 130c is about 80 µm (=2×40 µm).

As described in the above-described embodiments, the width "b" of the first, second, and third black matrices 130a, 130b, and 130c may be finally arranged as in Equation (10):

$$\left(\frac{2}{1-CT}\right)\{(1+CT)m - (CT \times p)\} \le b \le 2 \times m. \qquad (10)$$

Hereinafter, a stereoscopic image display device according to the present invention will be described in detail with reference to the following experimental example. However, the following experimental example is only an example, and thus the present invention is not limited thereto.

Table 1 shows experimental results of optimum design values of the black stripes 165 or the black matrices 130 relative to the size of a stereoscopic image display device. The distance "p" between adjacent ones of the black matrices 130 is a fixed design value of products, and a CT rate is a fixed value because the CT rate is a crosstalk value allowed for products. Also, since an adhesion margin "m" of the patterned retarder film 185 is a process characteristic, the adhesion margin "m" is also a fixed value. Accordingly, when optimum black stripes 165 and black matrices 130 are used, experimental results are obtained as shown in Table 1, from the above-described Equations.

TABLE 1

| | | | | s >= b | | s <= b | |
|---|---|---|---|---|---|---|---|
| Division | p (µm) | CT (%) | m (µm) | Min(s) (µm) | Max(s) (µm) | Min(b) (µm) | Max(b) (µm) |
| 42-inch | 483.3 | 1.75 | 50 | 86.3 | 100 | 86.3 | 100 |
| 47-inch | 541.5 | 1.75 | 50 | 84.3 | 100 | 84.3 | 100 |
| 55-inch | 630.0 | 1.75 | 50 | 81.1 | 100 | 81.1 | 100 |

As described above, the stereoscopic image display device according to the embodiments of the present invention may include black stripes 165 further formed on the black matrices 130 to improve crosstalk between stereoscopic images. Simultaneously, the black stripes 165 and the black matrices 130 can be designed to have optimum widths, thereby minimizing degradation of an aperture ratio and luminance.

A stereoscopic image display device according to embodiments of the present invention can include black stripes further formed on black matrices to improve crosstalk between stereoscopic images. Also, the black matrices and the black stripes can be designed to have optimum widths, thereby minimizing reductions in an aperture ratio and luminance.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents. In particular, although an example of a stereoscopic image display device is described, the present disclosure is not limited thereto and may be applied to image display devices including black stripes, black matrices, and a patterned retarder film.

What is claimed is:

1. A stereoscopic image display device comprising:
    a substrate;
    a plurality of black matrices formed parallel to one another on a first surface of the substrate;
    a plurality of black stripes formed on a second surface of the substrate opposite the first surface, each of the plurality of black stripes corresponding to one of the plurality of black matrices, each of the plurality of black stripes having a width equal to or greater than a width of the corresponding one of the plurality of black matrices; and
    a patterned retarder film formed on the plurality of black stripes, the patterned retarder film including a plurality of first retarder patterns and a plurality of second retarder patterns,
    wherein a first retarder pattern is disposed over a region between a first pair of black stripes, and a second retarder pattern is disposed over a region between a second pair of black stripes that is adjacent to the first pair of black stripes, and
    wherein the width of each of the plurality of black stripes is less than or equal to twice an adhesion margin of the patterned retarder film,
    wherein the adhesion margin is a length of a misalignment of interfaces of the first retarder patterns and the second retarder patterns with respect to a center of the plurality of black stripes or a center of the plurality of black matrices.

2. The display device of claim 1, wherein a first image passes through the first retarder pattern and a second image passes through the second retarder pattern, thereby displaying a stereoscopic image.

3. The display device of claim 1, wherein the width of the plurality of black stripes is further based on a crosstalk rate and a pixel size.

4. The display device of claim 3, wherein the crosstalk rate is a rate of the second image passing through at least one of the plurality of first retarder patterns, or a rate of the first image passing through at least one of the plurality of second retarder patterns.

5. The display device of claim 3, wherein the pixel size is a distance between a central portion of a first one of the plurality of black stripes and a central portion of a second one of the plurality of black stripes adjacent to the first one of the plurality of black stripes, or a distance between the central portion of the second one of the plurality of black stripes and a central portion of a third one of the plurality of black stripes adjacent to the second one of the plurality of black stripes.

6. The display device of claim 3, wherein the pixel size is a distance between a central portion of a first one of the plurality of black matrices and a central portion of a second one of the plurality of black matrices adjacent to the first one of the plurality of black matrices, or a distance between the central portion of the second one of the plurality of black matrices and a central portion of a third one of the plurality of black matrices adjacent to the second one of the plurality of black matrices.

7. The display device of claim 6, wherein the width of the plurality of black stripes is equal to or more than a value obtained by a following equation:

$$\left(\frac{2}{1-CT}\right)\{(1+CT)m - (CT \times p)\}$$

wherein CT denotes the crosstalk rate of stereoscopic images, m denotes the length of a misalignment of interfaces of the first retarder patterns and the second retarder patterns with respect to the center of the plurality of black stripes or the center of the plurality of black matrices, and p denotes a distance between a central portion of a first one of the plurality of black stripes and a central portion of a second one of the plurality of black stripes adjacent to the first one of the plurality of black stripes or a distance between a central portion of a first one of the plurality of black matrices and a central portion of a second one of the plurality of black matrices adjacent to the first one of the plurality of black matrices.

8. An image display device comprising:
a substrate;
a plurality of black matrices formed in a row on a first surface of the substrate;
a plurality of black stripes formed on a second surface of the substrate opposite the first surface, each of the plurality of black stripes corresponding to one of the plurality of black matrices, each of the plurality of black stripes having a width equal to or greater than a width of the corresponding one of the plurality of black matrices; and
a patterned retarder film formed on the plurality of black stripes, the patterned retarder film including a plurality of first retarder patterns and a plurality of second retarder patterns,
wherein a first retarder pattern is disposed over a region between a first pair of black stripes, and a second retarder pattern is disposed over a region between a second pair of black stripes that is adjacent to the first pair of black stripes, and wherein the width of each of the plurality of black stripes is within a range given by a following equation:

$$\left(\frac{2}{1-CT}\right)\{(1+CT)m - (CT \times p)\} \le s \le 2 \times m$$

wherein s denotes the width of the each of the plurality of black stripes, CT denotes a crosstalk rate of stereoscopic images, m denotes a length of a misalignment of interfaces of the first retarder patterns and the second retarder patterns with respect to a center of the plurality of black stripes or a center of the plurality of black matrices, and p denotes a distance between a central portion of a first one of the plurality of black stripes and a central portion of a second one of the plurality of black stripes adjacent to the first one of the plurality of black stripes or a distance between a central portion of a first one of the plurality of black matrices and a central portion of a second one of the plurality of black matrices adjacent to the first one of the plurality of black matrices.

9. An image display device comprising:
a substrate;
a plurality of black matrices formed in a row on a first surface of the substrate;
a plurality of black stripes formed on a second surface of the substrate opposite the first surface, each of the plurality of black stripes corresponding to one of the plurality of black matrices, each of the plurality of black stripes having a width less than a width of the corresponding one of the plurality of black matrices; and
a patterned retarder film formed on the plurality of black stripes, the patterned retarder film including a plurality of first retarder patterns and a plurality of second retarder patterns,
wherein a first retarder pattern is disposed over a region between a first pair of black stripes, and a second retarder pattern is disposed over a region between a second pair of black stripes that is adjacent to the first pair of black stripes,
wherein the width of each of the plurality of black matrices is less than or equal to twice an adhesion margin of the patterned retarder film, and
wherein the adhesion margin is a length of a misalignment of interfaces of the first retarder patterns and the second retarder patterns with respect to a center of the plurality of black stripes or a center of the plurality of black matrices.

10. The display device of claim 9, wherein a first image passes through the first retarder pattern and a second image passes through the second retarder pattern, thereby displaying a stereoscopic image.

11. The display device of claim 9, wherein the width of the plurality of black matrices is further based on a crosstalk rate and a pixel size.

12. The display device of claim 11, wherein the crosstalk rate is a rate of the second image passing through at least one of the plurality of first retarder patterns, or a rate of the first image passing through at least one of the plurality of second retarder patterns.

13. The display device of claim 11, wherein the pixel size is a distance between a central portion of a first one of the plurality of black stripes and a central portion of a second one of the plurality of black stripes adjacent to the first one of the plurality of black stripes, or a distance between the central portion of the second one of the plurality of black stripes and a central portion of a third one of the plurality of black stripes adjacent to the second one of the plurality of black stripes.

14. The display device of claim 11, wherein the pixel size is a distance between a central portion of a first one of the plurality of black matrices and a central portion of a second one of the plurality of black matrices adjacent to the first one of the plurality of black matrices, or a distance between the central portion of the second one of the plurality of black matrices and a central portion of a third one of the plurality of black matrices adjacent to the second one of the plurality of black matrices.

15. The display device of claim 11, wherein the width of the plurality of black matrices is equal to or more than a value obtained by a following equation:

$$\left(\frac{2}{1-CT}\right)\{(1+CT)m - (CT \times p)\}$$

wherein CT denotes the crosstalk rate of stereoscopic images, m denotes a length of a misalignment of interfaces of the first retarder patterns and the second retarder patterns with respect to the center of the plurality of black stripes or the center of the plurality of black matrices, and a distance between a central portion of a first one of the plurality of black stripes and a central portion of a second one of the plurality of black stripes adjacent to the first one of the plurality of black stripes or a distance between a central portion of a first one of the plurality of black matrices and a central portion of a second one of the plurality of black matrices adjacent to the first one of the plurality of black matrices.

16. An image display device comprising:

a substrate;

a plurality of black matrices formed in a row on a first surface of the substrate;

a plurality of black stripes formed on a second surface of the substrate opposite the first surface, each of the plurality of black stripes corresponding to one of the plurality of black matrices, each of the plurality of black stripes having a width equal to or less than a width of the corresponding one of the plurality of black matrices; and a patterned retarder film formed on the plurality of black stripes, the patterned retarder film including a plurality of first retarder patterns and a plurality of second retarder patterns, wherein a first retarder pattern is disposed over a region between a first pair of black stripes, and a second retarder pattern is disposed over a region between a second pair of black stripes that is adjacent to the first pair of black stripes, and wherein the width of each of the plurality of black matrices is within a range given by a following equation:

$$\left(\frac{2}{1-CT}\right)\{(1+CT)m - (CT \times p)\} \le b \le 2 \times m$$

wherein b denotes the width of the plurality of black matrices, CT denotes a crosstalk rate of stereoscopic images, m denotes a length of a misalignment of interfaces of the first retarder patterns and the second retarder patterns with respect to a center of the plurality of black stripes or a center of the plurality of black matrices, and p a distance between a central portion of a first one of the plurality of black stripes and a central portion of a second one of the plurality of black stripes adjacent to the first one of the plurality of black stripes or a distance between a central portion of a first one of the plurality of black matrices and a central portion of a second one of the plurality of black matrices adjacent to the first one of the plurality of black matrices.

17. A stereoscopic image display device comprising:

a substrate;

a plurality of light blocking matrices formed on a first surface of the substrate;

a plurality of light blocking stripes formed on a second surface of the substrate, wherein each of the plurality of light blocking stripes corresponds to a respective one of the plurality of light blocking matrices; and a patterned retarder film formed on the plurality of light blocking stripes;

wherein a width of each of the plurality of light blocking stripes is greater than a width of each corresponding one of the plurality of light blocking matrices or the width of each of the plurality of light blocking stripes is less than the width of each corresponding one of the plurality of light blocking matrices to reduce cross talk in three-dimensional images generated by the stereoscopic image display device, wherein a larger one of the width of each of the plurality of light blocking stripes and the width of each of the plurality of light blocking matrices is less than or equal to twice an adhesion margin of the patterned retarder film, wherein the patterned retarded film comprises a plurality of first retarder patterns and a plurality of second retarder patterns, and wherein the adhesion margin is a length of a misalignment of interfaces of the first retarder patterns and the second retarder patterns with respect to a center of the plurality of light blocking stripes or a center of the plurality of light blocking matrices.

18. The stereoscopic image display device of claim 17, wherein a center of each of the plurality of light blocking stripes is aligned with a center of a corresponding one of the plurality of light blocking matrices.

19. The stereoscopic image display device of claim 17, wherein edges of the plurality of first retarder patterns and edges of the plurality of second retarder patterns are misaligned relative to the center of the plurality of light blocking stripes and the center of the plurality of light blocking matrices.

20. The stereoscopic image display device of claim 19, wherein the width of each of the plurality of light blocking stripes is less than or equal to double a length of the misalignment of the edges of the plurality of first retarder patterns and the edges of the plurality of second retarder patterns with the center of the plurality of light blocking stripes and the center of the plurality of light blocking matrices.

21. The stereoscopic image display device of claim 19, wherein the width of each of the plurality of light blocking matrices is less than or equal to double a length of the misalignment of the edges of the plurality of first retarder patterns and the edges of the plurality of second retarder patterns with the center of the plurality of light blocking stripes and the center of the plurality of light blocking matrices.

22. The stereoscopic image display device of claim 19, wherein the width of each of the plurality of light blocking matrices is a minimum width defined by a following equation:

$$\left(\frac{2}{1-CT}\right)\{(1+CT)m - (CT \times p)\}$$

wherein CT represents a crosstalk rate of stereoscopic images displayed by the stereoscopic image display device, m denotes a length of the misalignment of the edges of the plurality of first retarder patterns and the edges of the plurality of second retarder patterns with the center of the plurality of light blocking stripes and the center of the plurality of light blocking matrices, and p represents a distance between the center of the plurality of light blocking stripes and the center of the plurality of light blocking matrices.

\* \* \* \* \*